United States Patent
Liu

(10) Patent No.: US 7,260,717 B2
(45) Date of Patent: Aug. 21, 2007

(54) SYSTEM AND METHOD FOR PERFORMING KERNEL-MODE OPERATIONS

(75) Inventor: Wei-Hong Liu, Taipei Hsien (TW)

(73) Assignee: Wistron Corporation, Taipei Hsien (TW)

(*) Notice: Subject to any disclaimer, the term of this patent is extended or adjusted under 35 U.S.C. 154(b) by 726 days.

(21) Appl. No.: 10/690,871

(22) Filed: Oct. 22, 2003

(65) Prior Publication Data

US 2004/0133802 A1 Jul. 8, 2004

(30) Foreign Application Priority Data

Jan. 7, 2003 (TW) .............................. 92100252 A

(51) Int. Cl.
*H04L 9/00* (2006.01)
(52) U.S. Cl. .......................... 713/166; 713/164; 726/2; 719/321; 718/1; 718/100
(58) Field of Classification Search .................. None
See application file for complete search history.

(56) References Cited

U.S. PATENT DOCUMENTS

| | | | | |
|---|---|---|---|---|
| 5,584,023 | A * | 12/1996 | Hsu ........................... | 707/204 |
| 5,752,031 | A * | 5/1998 | Cutler et al. ................. | 718/103 |
| 6,412,053 | B2 * | 6/2002 | Bonola ........................ | 711/170 |
| 6,480,919 | B2 * | 11/2002 | Bonola ........................ | 710/262 |
| 6,598,169 | B1 * | 7/2003 | Warwick et al. ............. | 713/320 |
| 6,779,035 | B1 * | 8/2004 | Gbadegesin ................. | 709/228 |
| 6,804,784 | B1 * | 10/2004 | Friedman et al. ............. | 726/29 |
| 7,003,775 | B2 * | 2/2006 | Lacombe et al. ........... | 719/313 |
| 7,065,633 | B1 * | 6/2006 | Yates et al. .................. | 712/227 |
| 2002/0152331 | A1 * | 10/2002 | Wong et al. ................. | 709/321 |

OTHER PUBLICATIONS

Gao, et al, "Embedded microprocessor protection mode of high-privilege system call," Chinese Journal of Computers, 2000, v. 23 n. 3, pp. 318-323.*
Cheriton, et al., "A Caching Model of Operating System Kernel Functionality," Proceedings of the First Symposium on Operating Systems Design and Implementation, Usenix Association, Nov. 1994.□□.*
Katayama et al., "A Method for Automatic Generation of Device Drivers with a Formal Specification Language," Operating Systems Review, 1995, v. 29 n.3, pp. 91-96.*
Gao, et al., "Embedded microprocessor protection mode of high-privilege system call," Chinese Journal of Computers, 2000, v. 23 n.3, pp. 318-323. (English Translation).*

* cited by examiner

*Primary Examiner*—Gilberto Barron, Jr.
*Assistant Examiner*—Beatrice Keompel-Thomas
(74) *Attorney, Agent, or Firm*—Quintero Law Office

(57) ABSTRACT

A method and system for performing kernel-mode operations. A kernel-mode interface generator is provided for dynamically generating a kernel-mode interface driver. The kernel-mode interface driver in turn generates a call gate to perform a kernel-mode operation with kernel-mode authorization in a kernel mode. An authorization interface is coupled to the kernel-mode interface generator. The authorization interface connects a user mode to kernel mode, switching a process from user mode to kernel mode via the call gate to perform the kernel-mode operation.

27 Claims, 5 Drawing Sheets

SYSTEM AND METHOD FOR PERFORMING KERNEL-MODE OPERATIONS

BACKGROUND OF THE INVENTION

1. Field of the Invention

The present invention relates to a system and method for performing kernel-mode operations, and in particular to a system and method for performing secure kernel-mode operations, executing a low-level debugging process.

2. Description of the Related Art

Using debugging processes, software engineers are the bridge between software and hardware, determining errors in software, such as BIOS (Basic Input/Output System), drivers, or operating systems, and in hardware.

FIG. 1 is a schematic diagram showing architecture access system resources in a disk operating system (DOS). The architecture comprises application/tool 11, BIOS 13, authorized instruction 15, I/O (Input/Output) port 17 and memory 19. Traditionally, an operating system, such as disk operating system, opens all system resources to users, accessing BIOS 13 or executing low-level operations, performing authorized instruction 15 or accessing I/O port 17 and memory 19, through application/tool 11, none of which create serious problems during debugging.

Currently, operating systems must transit from the traditional CPU (Central Processing Unit) operating mode (real mode herein) to a 32-bit protected mode, providing enhanced operating efficiency and system resource management. Under protected mode, the operating system restricts and prohibits most of system recourses, thus the accessibility of the system resources and operations are available to only those holding the highest authorization, such as Ring 0 authorization.

FIG. 2 is a schematic diagram showing kernel-mode operations performed through a kernel-mode driver in a Windows operating system, comprising application/tool 21, kernel-mode interface driver 23, BIOS 251, authorized instruction 253, I/O port 257 and memory 259. Application/tool 21 and kernel-mode interface driver 23 are executed in a user mode, while BIOS 251, authorized instruction 253, I/O port 257 and memory 259, are stored in a kernel mode. In conventional methods, to obtain Ring 0 authorization, kernel-mode interface driver 23 must be programmed using application/tool 21, via a driver call procedure, to enter kernel mode by performing a system call, directly accessing BIOS 251, or performing low-level operations such as executing authorized instructions 253 or accessing I/O port 257 and memory 259, implemented by driver development kit (DDK) in the Windows operating system.

FIG. 3 shows a schematic diagram performing kernel-mode operations using the driver development kit (DDK). Fundamentally, DDK packages desired data processed in a kernel mode to form an I/O request packet (IRP) 31, and informing a driver by a system call with a function DeviceIoControl( ) with respect to IRQ 31 and control codes. Next, hardware 37, such as authorized instruction 371, I/O port 373 and memory 375, is accessed by I/O management system 33 through a series of transformations to hardware abstraction layer 35, and the procedure is complete.

Such a procedure, however, causes problems with system manufacturing, since, although normal use seeks to implement tasks with simple and intuitive kernel-mode operations, conditions become more complex and varied during system development, such that a specific kernel-mode driver may not be able to handle some situations. In addition, time limitations placed on some operations may affect accuracy. DDK can be difficult to work with, and applications proven in DOS may be difficult to transfer to other system architectures using a kernel-mode driver, requiring revision of software architecture or re-programming of source code.

SUMMARY OF THE INVENTION

Accordingly, an object of the present invention is to provide a system for performing kernel-mode operations, having applications with high (Ring 0) authorization to be performed in kernel mode.

Another object of the invention is to enable kernel-mode operations in a protected mode.

According to the objects described above, a kernel-mode interface generator generating a kernel-mode interface driver generating a call gate is provided, enabling the call gate to perform an operation with Ring 0 authorization in a kernel mode. Next, an authorization interface is provided to connect user and kernel modes, switching a process in the user mode to the kernel mode through the call gate to perform an operation with the highest authorization.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention provides a system and method for performing kernel-mode operations in a protected mode.

Figure 1:
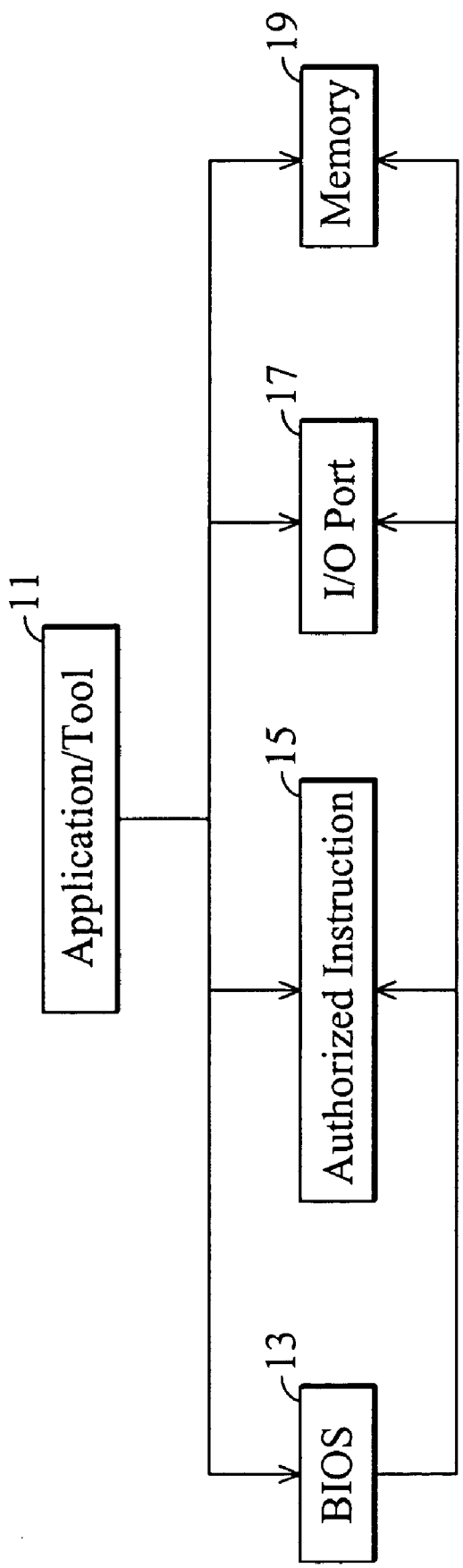
FIG. 1 is a schematic diagram showing conventional system resource access in a disk operating system (DOS)
Figure 2:
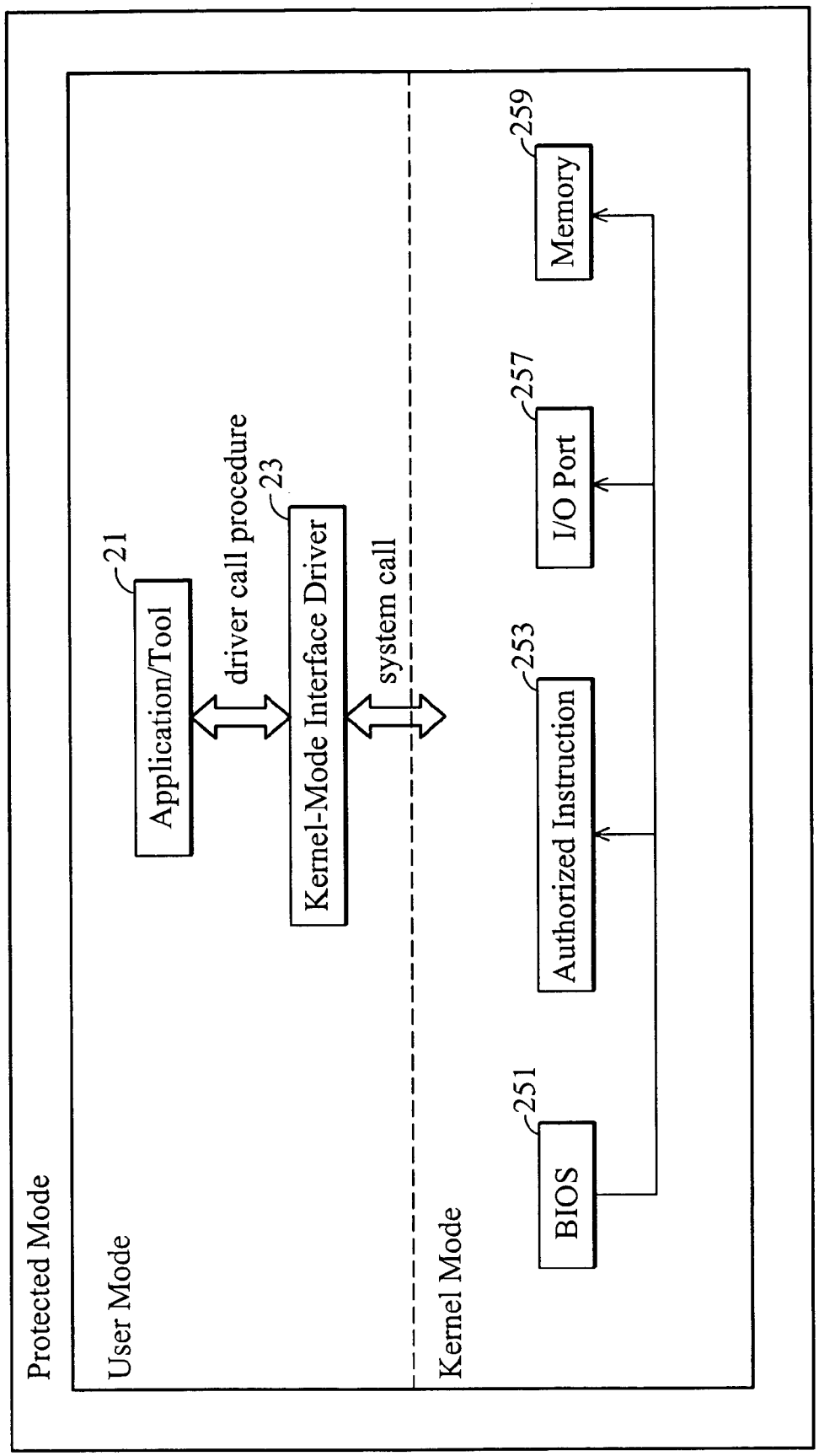
FIG. 2 is a schematic diagram showing conventional kernel-mode operations performed through a kernel-mode driver in Windows operating system.
Figure 3:
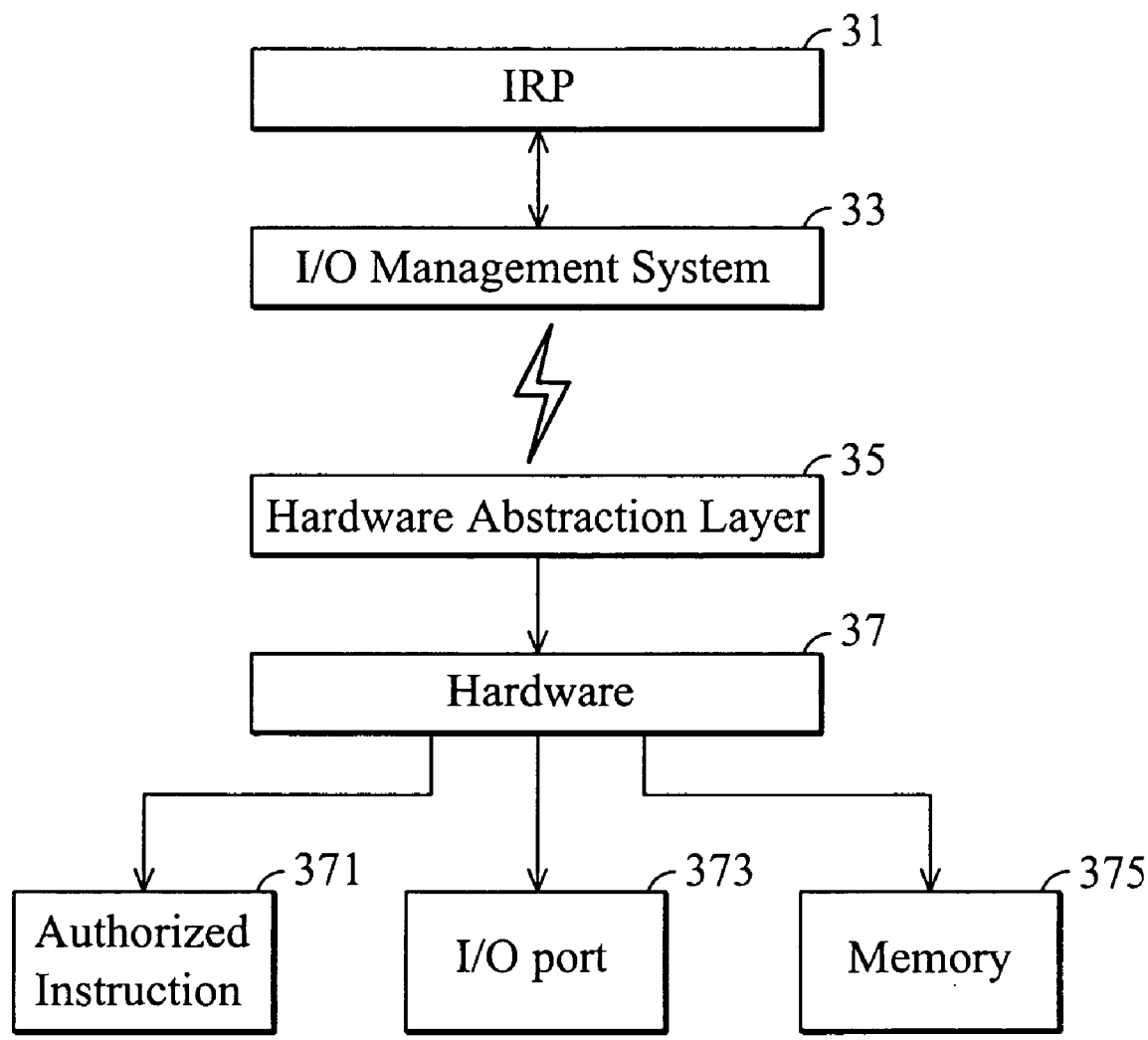
FIG. 3 is a schematic diagram of conventional kernel-mode operations performed using a driver development kit.
Figure 4:
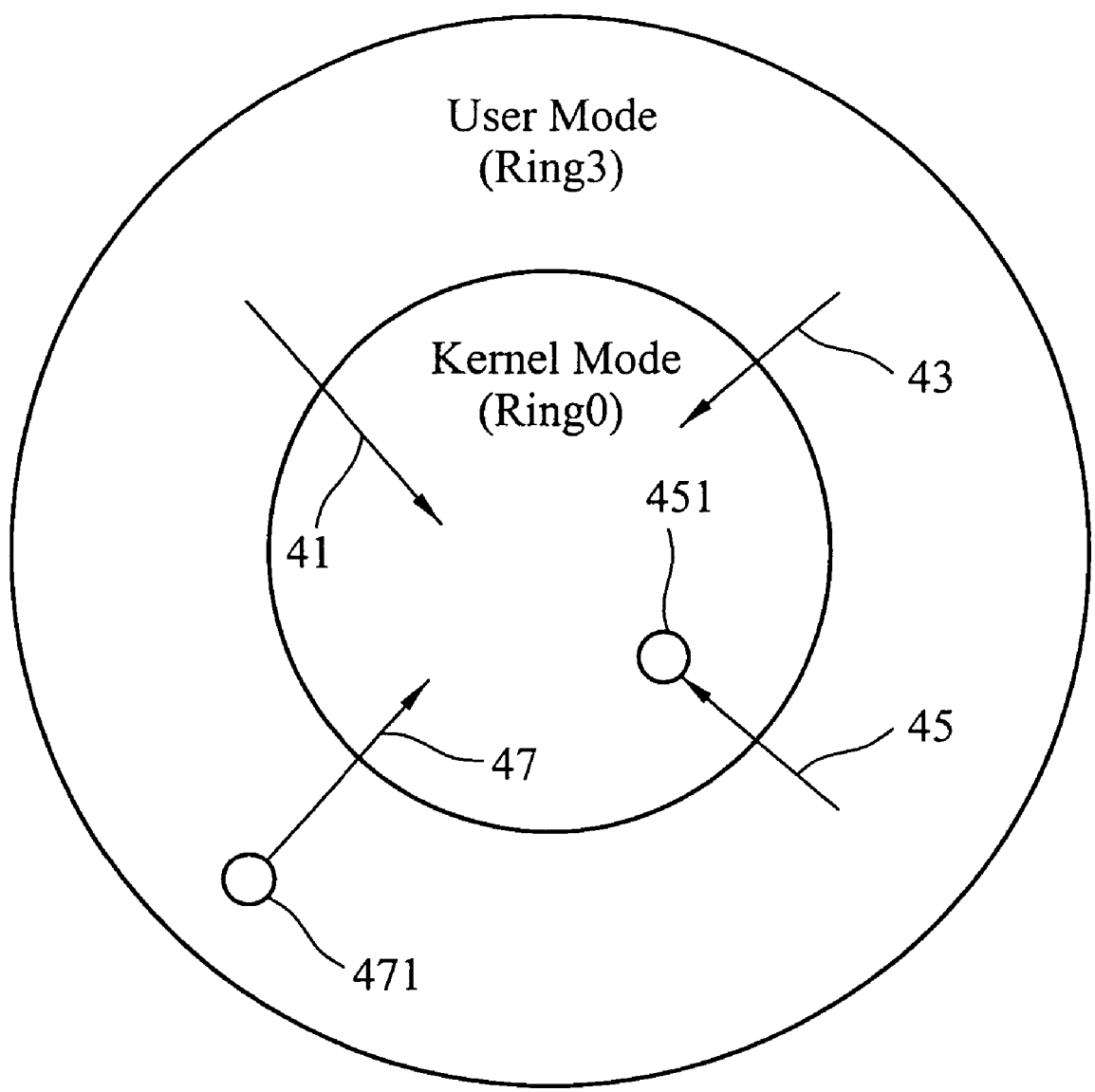
FIG. 4 is a schematic diagram showing conventional processes in a user mode performing operations with the highest authorization in an operating system.

FIG. 4 is a schematic diagram showing conventional processes in a user mode performing operations with the highest authorization in an operating system. Windows operating systems, such as Windows NT/2K/XP, are protected-mode operating systems, in which most system resources are restricted or accessible only with highest authorization. The highest authorization is required by a central processing unit (CPU) once it enters a kernel mode of an operating system, to access most system resources.

It is known that kernel mode for a process converts user-mode authorization to kernel-mode authorization by reasonable methods, as shown in FIG. 4.

Task switch 41 is a context switch operation generated by an operating system as a clock reading is obtained. Most contents of a CPU register for a current task are reserved as task switch operations occur, with the contents of the subsequent task loaded, task switch 41 switching tasks with different authorization levels.

System interrupt 43 is triggered by an operating system or system hardware, similar to the task switch, except that the CPU is not charged with contents of the register to be reserved by interrupt service routines (ISR). Interruptions usually occur with an authorization-level switch, especially for interrupt requests (IRQ) by hardware or operating systems.

Authorization switch instruction (SYSENTER and SYSEXIT herein) 45 is provided by the CPU to enable a task to obtain the highest authorization through a specific entry point 451, initialized by operating systems and generally utilized by device drivers to instruct the operating system to assist in low-level hardware operations.

Call gate 47, having higher authorization than a general procedure call, is an authorization-level switch mechanism provided by the CPU for switching authorization, allocating a selector and an entry point 471 in a global descriptor table, enabling tasks corresponding to authorization level requests, to switch authorization through the entry point 471, and switching the authorization level back after tasks are complete.

Only authorization switch instruction 45 and call gate 47 are controllable for applications that determine when to switch authorization. However, when authorization switch instructions are used, related model-specific registers (MSR) must be set first, providing the single entry point. It is thus difficult to change or add any authorization entry points for applications. Therefore, the present invention uses the call gate to change or add authorization entry points by application.

Figure 5:
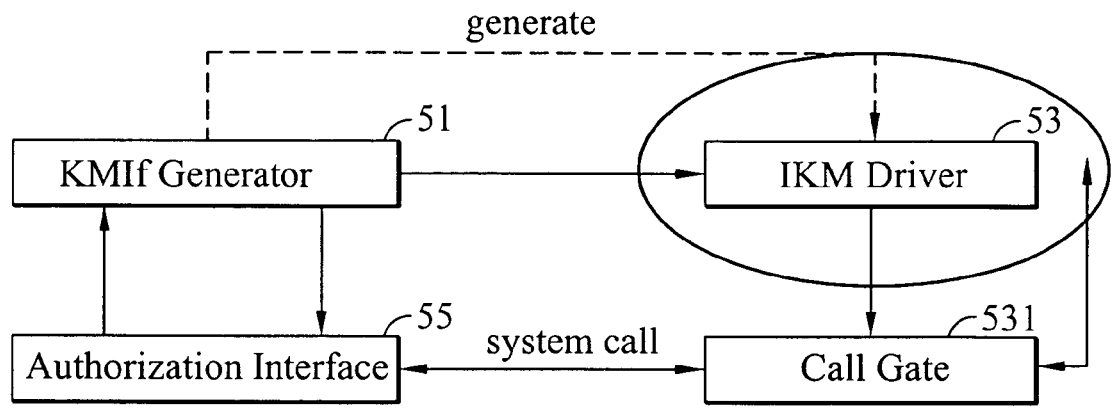
FIG. 5 is a schematic diagram showing the system for performing kernel-mode operations according to the present invention.

FIG. 5 is a schematic diagram showing the system for performing kernel-mode operations according to the present invention. The architecture comprises a kernel-mode interface generator (KMIf Generator) 51, a kernel-mode interface driver (IKM Driver) 53 and an authorization interface 55. Kernel-mode interface generator 51 generates kernel-mode interface driver 53 enabling correlation with authorization interface 55. Kernel-mode interface driver 53, dynamically generated by kernel-mode interface generator 51, generates call gate 531 and sets attributes of kernel variables used thereby. In addition, authorization interface 55 is the bridge between user and kernel modes and provides class methods enabling processes with user-mode authorization to perform kernel-mode operations.

Most authorized or restricted instructions, such as I/O port read/write, enable/disable interrupt, read/write MSR, and others, identified by CPU or operating system, are implemented by class methods. Furthermore, authorized instructions not supported by the present invention or system calls as transformations between linear addresses and physical addresses, necessary to pass authorization checking, provide callback functions like Ring 0 Function( ) for handling kernel-mode operations.

Briefly, authorization interface 55, according to the present invention, sends a system call to enable processes with lower authorization to acquire highest authorization through call gate 531 to access system resources or perform operations requiring higher authorization.

Figure 6:
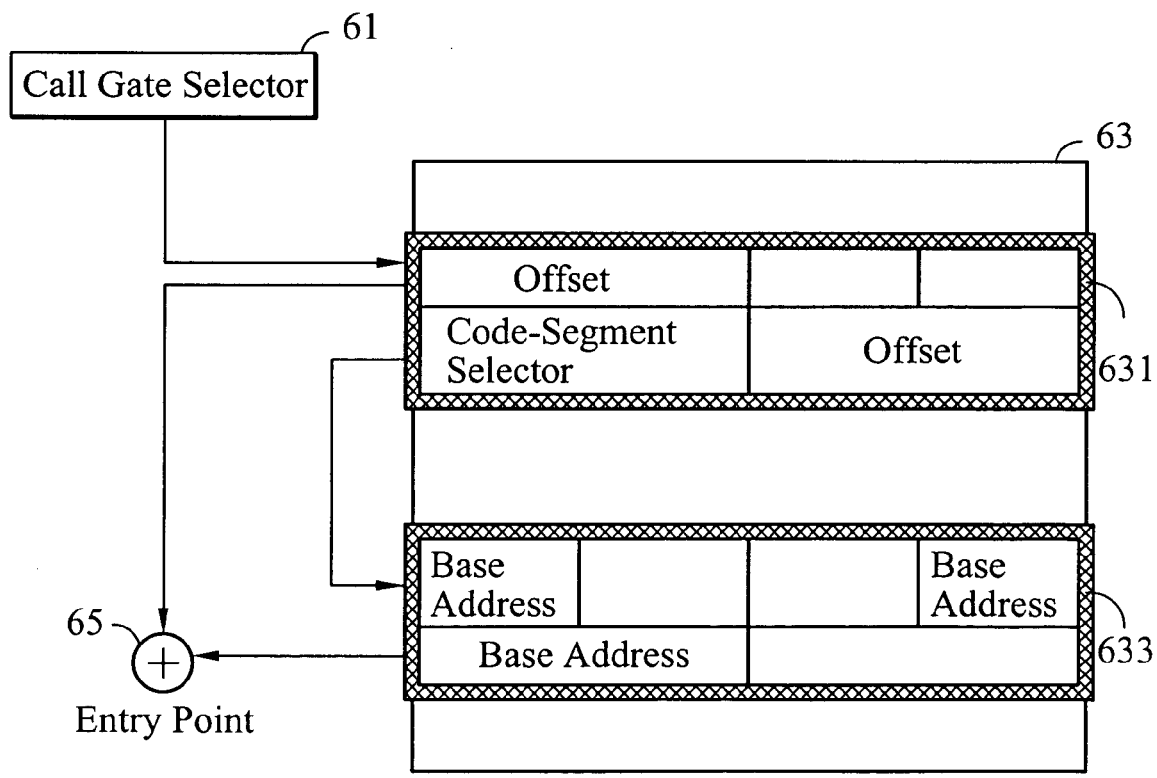
FIG. 6 is a schematic diagram showing a process in a user mode switched to a kernel mode to perform operations with the highest authorization according to the present invention.

FIG. 6 is a schematic diagram showing a process in user mode switched to kernel mode to perform operations with the highest authorization according to the present invention. Call gate is implemented by the following call far instruction:

call far CallGateSelector:CallGateOff where "CallGateoff" is an arbitrary variable, a far pointer to call gate. As shown in FIG. 6, call gate selector 61 represented as a far pointer points to call gate descriptor 631 with selector information for entry point 65 and authorization level information for applicable call gates in global descriptor table 63. Accordingly, when a caller of call gate gives a call, it is determined whether the caller has corresponding authorization to determine whether the code-segment descriptor 633 to which the call gate points is taken. CPU performs stack switch if authorization checking is passed, with authorization level switch, and switches an instruction pointer to entry point 65, to obtain the address that sums up base address stored in code-segment descriptor 633 and offset stored in call gate descriptor 631.

The authorization level of the call gate is changed once its instruction pointer reaches the entry point, and the kernel-mode interface gives the call gate the highest authorization level enabling the caller to have the highest authorization to access system resources including I/O port read/write, memory access, and use of authorized instructions. The authorization level of the call gate is returned to user-mode authorization after it has performed the kernel-mode operations.

The method according to the present invention enables applications with user-mode authorization to execute tasks with kernel-mode authorization and enables programming of kernel-mode applications with intuitive system operation aspects, shortening execution time for kernel-mode functions to achieve real-time performance optimization, and increase software flexibility in kernel-mode operations for dynamic program codes.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for performing kernel-mode operations comprising:
   a kernel-mode interface generator for dynamically generating a kernel-mode interface driver, which in turn generates a call gate to perform a kernel-mode operation with kernel-mode authorization in a kernel mode; and
   an authorization interface, coupled to the kernel-mode interface generator, to connect a user mode to kernel mode, switching a process from user mode to kernel mode via the call gate to perform the kernel-mode operation.

2. The system as claimed in claim 1, wherein the authorization interface sends a call gate request to the kernel-mode interface generator to generate the kernel-mode interface driver, the call gate generated accordingly, and the authorization interface instructing the process to enter the kernel mode through the call gate.

3. The system as claimed in claim 1, wherein the kernel-mode operation is an operation with Ring 0 authorization level in the kernel mode.

4. The system as claimed in claim 1, wherein the process, a user-mode operation, is capable of user-mode authorization in a protected mode.

5. The system as claimed in claim 4, wherein the user-mode authorization is Ring 3 authorization level in the protected mode.

6. The system as claimed in claim 4, wherein the call gate sets a call gate selector and an entry point in a global descriptor table, having a call gate descriptor and a code-segment descriptor, to enable the process to perform the operation with kernel-mode authorization in the kernel mode.

7. The system as claimed in claim 6, wherein the user-mode authorization of the process is switched to kernel-mode authorization by the call gate selector via the entry point in the global descriptor table, and is switched back after the operation with kernel-mode authorization has been performed.

8. The system as claimed in claim 7, wherein a far call stated by the call gate selector points to the call gate descriptor, and a CPU switches an instruction pointer to the entry point, when a caller from the call gate gives a call, if the caller has kernel-mode authorization.

9. The system as claimed in claim 8, wherein the instruction pointer has kernel-mode authorization, is switched to the entry point, to perform the operation with kernel-mode authorization in the kernel mode, and is switched back to the user-mode authorization after the operation with kernel-mode authorization has been performed.

10. A method for performing kernel-mode operations comprising steps of:
providing a kernel-mode interface generator;
dynamically generating a kernel-mode interface driver using the kernel-mode interface generator;
generating a call gate performing a kernel-mode operation with kernel-mode authorization in a kernel mode using the kernel-mode interface driver;
providing an authorization interface to connect a user mode to the kernel mode; and
switching a process from the user mode to the kernel mode via the call gate through the authorization interface to perform the kernel-mode operation with kernel-mode authorization.

11. The method as claimed in claim 10, further comprising, in the step of providing the authorization interface:
sending of a call gate request by the authorization interface to the kernel-mode interface generator to generate the kernel-mode interface driver;
generating the call gate using the kernel-mode interface driver; and
the authorization interface instructing the process to enter the kernel mode through the call gate.

12. The method as claimed in claim 10, wherein in the generating step, the kernel-mode operation is an operation with Ring 0 authorization level in the kernel mode.

13. The method as claimed in claim 10, wherein in the switching step, the process, a user-mode operation, is capable of user-mode authorization in a protected mode.

14. The method as claimed in claim 13, wherein the user-mode authorization is Ring 3 authorization level in the protected mode.

15. The method as claimed in claim 13, wherein in the generating step, the call gate sets a call gate selector and an entry point in a global descriptor table, having a call gate descriptor and a code-segment descriptor, to perform the operation with kernel-mode authorization in the kernel mode.

16. The method as claimed in claim 15, wherein the user-mode authorization of the process is switched to kernel-mode authorization by the call gate selector via the entry point in the global descriptor table, and is switched back after the operation with kernel-mode authorization has been performed.

17. The method as claimed in claim 16, wherein a far call stated by the call gate selector points to the call gate descriptor, a CPU switches an instruction pointer to the entry point, when a caller from the call gate sends a call, if the caller has kernel-mode authorization.

18. The method as claimed in claim 17, wherein the instruction pointer has kernel-mode authorization, is switched to the entry point, to perform the operation with kernel-mode authorization in the kernel mode, and is switched back to user-mode authorization after performing the operation with kernel-mode authorization.

19. A storage medium for storing a computer program providing a method for per-forming kernel-mode operations, comprising using a computer to perform the steps of:
providing a kernel-mode interface generator;
dynamically generating a kernel-mode interface driver using the kernel-mode interface generator;
generating a call gate performing a kernel-mode operation with kernel-mode authorization in a kernel mode using the kernel-mode interface driver;
providing an authorization interface to connect a user mode to the kernel mode; and
switching a process from the user mode to the kernel mode via the call gate through the authorization interface to perform the kernel-mode operation with kernel-mode authorization.

20. The storage medium as claimed in claim 19, wherein the authorization interface sends a call gate request to the kernel-mode interface generator to generate the kernel-mode interface driver, the call gate is generated according thereto, and the authorization interface directs the process to enter the kernel mode through the call gate.

21. The storage medium as claimed in claim 19, wherein the kernel-mode operation is an operation with Ring 0 authorization level in the kernel mode.

22. The storage medium as claimed in claim 19, wherein the process, a user-mode operation, is capable of user-mode authorization in a protected mode.

23. The storage medium as claimed in claim 22, wherein the user-mode authorization is Ring 3 authorization level in the protected mode.

24. The storage medium as claimed in claim 23, wherein the call gate sets a call gate selector and an entry point in a global descriptor table, having a call gate descriptor and a code-segment descriptor, to perform the operation with kernel-mode authorization in the kernel mode.

25. The storage medium as claimed in claim 24, wherein the user-mode authorization of the process is switched to kernel-mode authorization by the call gate selector via the entry point in the global descriptor table, and is switched back after the operation with kernel-mode authorization has been performed.

26. The storage medium as claimed in claim 25, wherein a far call stated by the call gate selector points to the call gate descriptor, a CPU switches an instruction pointer to the entry point, when a caller from the call gate sends a call, if the caller has kernel-mode authorization.

27. The storage medium as claimed in claim 26, wherein the instruction pointer has kernel-mode authorization, is switched to the entry point, to perform the operation with kernel-mode authorization in the kernel mode, and is switched back to user-mode authorization after performing the operation with kernel-mode authorization.

* * * * *